( 12 ) United States Patent
Komai et al.

(10) Patent No.: US 7,679,634 B2
(45) Date of Patent: Mar. 16, 2010

(54) METHOD AND APPARATUS FOR IMAGE FORMING CAPABLE OF DETECTING A REFERENCE SIGNAL FOR A LIGHTING CONTROL

(75) Inventors: Kunihiro Komai, Ikeda (JP); Katsuhiko Maeda, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 362 days.

(21) Appl. No.: 11/563,563

(22) Filed: Nov. 27, 2006

(65) Prior Publication Data

US 2007/0263270 A1 Nov. 15, 2007

(30) Foreign Application Priority Data

Nov. 25, 2005 (JP) .............................. 2005-339871

(51) Int. Cl.
*B41J 2/435* (2006.01)
*B41J 2/47* (2006.01)
(52) U.S. Cl. ........................................ 347/235; 347/250
(58) Field of Classification Search ................. 347/229, 347/234–237, 246–250; 359/204, 204.1; 358/1.7, 475; 250/234, 236
See application file for complete search history.

(56) References Cited

U.S. PATENT DOCUMENTS 4,962,312 A * 10/1990 Matuura et al. ............. 250/236
6,301,021 B1 * 10/2001 Ohnuma ..................... 358/475
6,815,663 B2 * 11/2004 Ueda .......................... 250/234
7,064,877 B2 * 6/2006 Kato .......................... 359/204.1
7,236,281 B2 * 6/2007 Hayashi et al. ............. 359/204
2004/0169905 A1 9/2004 Hayashi et al.
2006/0023231 A1 * 2/2006 Ohmiya ...................... 358/1.7

FOREIGN PATENT DOCUMENTS

JP 2003-029181 1/2003

* cited by examiner

*Primary Examiner*—Hai C Pham
(74) *Attorney, Agent, or Firm*—Oblon, Spivak, McClelland, Maier & Neustadt, L.L.P.

(57) ABSTRACT

An image forming apparatus includes a light emission source, a polygon mirror, a plurality of image carrying members, an optical detection mechanism, and an instruction mechanism. The light emission source outputs a plurality of optical beams in accordance with image data. The polygon mirror receives the optical beams at different mirror points, and deflects the beams into a first plurality of scanning optical beams in given directions to scan on predetermined scanning lines in a main scanning direction. The plurality of image carrying members rotating in a sub-scanning direction receive the first plurality of scanning optical beams to form primary separate color images. The optical detection mechanism detects a second plurality of scanning optical beams included in the first plurality of scanning optical beams. The instruction mechanism instructs the light emission source to light on and off at timings based on a plurality of detection signals from the optical detection mechanism.

18 Claims, 5 Drawing Sheets

METHOD AND APPARATUS FOR IMAGE FORMING CAPABLE OF DETECTING A REFERENCE SIGNAL FOR A LIGHTING CONTROL

CROSS-REFERENCE TO RELATED APPLICATION

This patent application is based on Japanese patent application, No. 2005-339871 filed on Nov. 25, 2005 in the Japan Patent Office, the entire contents of which are incorporated by reference herein.

BACKGROUND OF THE INVENTION

1. Field of the Invention

Exemplary aspects of the present invention relate to a method and apparatus for image forming, and more particularly to a method and an apparatus for toner image forming capable of detecting a reference signal used for a lighting control.

2. Description of the Related Art

A related art image forming apparatus such as a laser printer, a digital copying machine, a facsimile, etc., has employed an optical beam scanning method for an image writing. According to the optical beam scanning method, a lighting (light emission) of a laser diode (LD) outputting a plurality of optical beams is controlled by image data, and a rotation polygon mirror deflects the plurality of optical beams to scan periodically in a main scanning direction. Thereby the optical beams irradiate a photoconductor moving towards in a sub-scanning direction so as to write an image on the photoconductor by each line.

When the image is written on the photoconductor by the optical beam scanning method, the photoconductor has an image writing start position thereon to begin the image writing. Since this image writing position needs to remain constant for each scanning line, a synchronous detection sensor is used to detect that the optical beams are disposed outside an image region of the photoconductor in an image writing start position side. The synchronous detection sensor detects a passage of the optical beams scanned in the main scanning direction (also referred to as a main scanning line) by the rotation polygon mirror, and instructs a lighting timing of the LD for each main scanning line with a synchronous detection signal generated thereby as a reference so as to control the image writing start position to be constant.

Regarding a color image formed by a related art color image forming apparatus, in general, a number of the photoconductors to be used is substantially equal to a number of color components. The photoconductors are scanned by the optical beams of respective color components, and images of different colors are superimposed by a transfer process so as to form a full color image. This formation of the full color image is referred to as a tandem system, and has been widely used.

As the tandem system exposes the photoconductors of respective color components to the optical beams, the image writing is controlled for each color component based on the synchronous detection signals generated by the synchronous detection sensors.

Therefore, the related art color image forming apparatus employing the tandem system generally superimposes the images of four colors, i.e., yellow, magenta, cyan, and black, formed on respective photoconductors so as to form the full color image. Thereby, the synchronous detection signals for the four colors are generated by using four different synchronous detection sensors.

In addition to using the four synchronous detection sensors with respect to the optical beams of respective colors, one example has attempted to use two synchronous detection sensors in another related art color image forming apparatus. Each synchronous detection sensor is commonly used for two color components.

According to this example of using the two synchronous detection sensors, one polygon mirror capable of scanning the four color components is employed. The four optical beams for the four color components are divided into two groups, for example, black and cyan, and magenta and yellow. The one polygon mirror has a plurality of mirror faces into which the optical beams are entered with respect to each group. The two optical beams of different color components in each group are detected by one of the two synchronous detection sensors. Each of the two synchronous detection sensors outputs the synchronous detection signals of the two optical beams which can be separated based on a time period by shifting a detection timing of each optical beam.

SUMMARY OF THE INVENTION

According to an aspect of the invention, an image forming apparatus includes a light emission source, a rotary polygon mirror, a plurality of image carrying members, an optical detection mechanism, and an instruction mechanism. The light emission source outputs a plurality of optical beams in accordance with image data. The rotary polygon mirror receives the plurality of optical beams at different mirror points with different mirror positions, and deflects the beams into a first plurality of scanning optical beams in given directions to cyclically scan on a plurality of predetermined scanning lines in a main scanning direction. The plurality of image carrying members rotate in a sub-scanning direction line by line, and respectively receive the first plurality of scanning optical beams to form a plurality of primary separate color images. The optical detection mechanism detects at a specific point a second plurality of scanning optical beams included in the first plurality of scanning optical beams. The instruction mechanism instructs the light emission source to light on and off at timings determined based on a plurality of detection signals from the optical detection mechanism.

According to another aspect of the invention, a method of image forming includes providing, rotating, diving, detecting, and instructing. The proving step provides a light emission source to output a plurality of optical beams in accordance with image data. The rotating step rotates a rotary polygon mirror to receive the plurality of optical beams at different mirror points with different mirror positions so as to deflect the beams into a first plurality of scanning optical beams in given directions to cyclically scan on a plurality of predetermined scanning lines in a main scanning direction. The driving step drives a plurality of image carrying members to rotate in a sub-scanning direction line by line so as to respectively receive the first plurality of scanning optical beams to form a plurality of primary separate color images. The detecting step detects at a specific point a second plurality of scanning optical beams included in the first plurality of scanning optical beams with an optical detection mechanism. The instructing step instructs the light emission source to light on and off at timings determined based on the plurality of detection signals from the optical detection mechanism.

According to another aspect of the invention, an optical writing apparatus includes a light emission source, a rotary polygon mirror, an optical detection mechanism, and an instruction mechanism. The light emission source outputs a plurality of optical beams in accordance with image data. The rotary polygon mirror receives the plurality of optical beams at different mirror points with different mirror positions, and deflects the beams into a first plurality of scanning optical beams in given directions so as to cyclically scan along a plurality of predetermined scanning lines in a main scanning direction on a plurality of image carrying members provided to rotate in a sub-scanning direction line by line and to respectively receive the first plurality of scanning optical beams to form a plurality of primary separate color images. The optical detection mechanism detects at a specific point a second plurality of scanning optical beams included in the first plurality of scanning optical beams. The instruction mechanism instructs the light emission source to light on and off at timings determined based on a plurality of detection signals from the optical detection mechanism.

According to still another aspect of the invention, an image forming apparatus includes plural light emission sources each configured to output an optical beam, a light reflecting unit configured to receive the optical beam from each light emission source of the plural light emission sources and to reflect the optical beam, plural image carrying members each configured to receive a corresponding optical beam reflected by the light reflecting unit, a single optical detection mechanism configured to receive each optical beam of at least half of the plural light emission sources prior to arriving at the plural image carrying members, and to generate detection signals, each corresponding to one of the at least half of the plural light emission sources, and an instruction mechanism configured to instruct each light emission source when to light on and off, at different timings, based on the detection signals corresponding to the at least half of the plural light emission sources.

BRIEF DESCRIPTION OF THE DRAWINGS

A more complete appreciation of the exemplary aspects of the invention and many of the attendant advantage thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
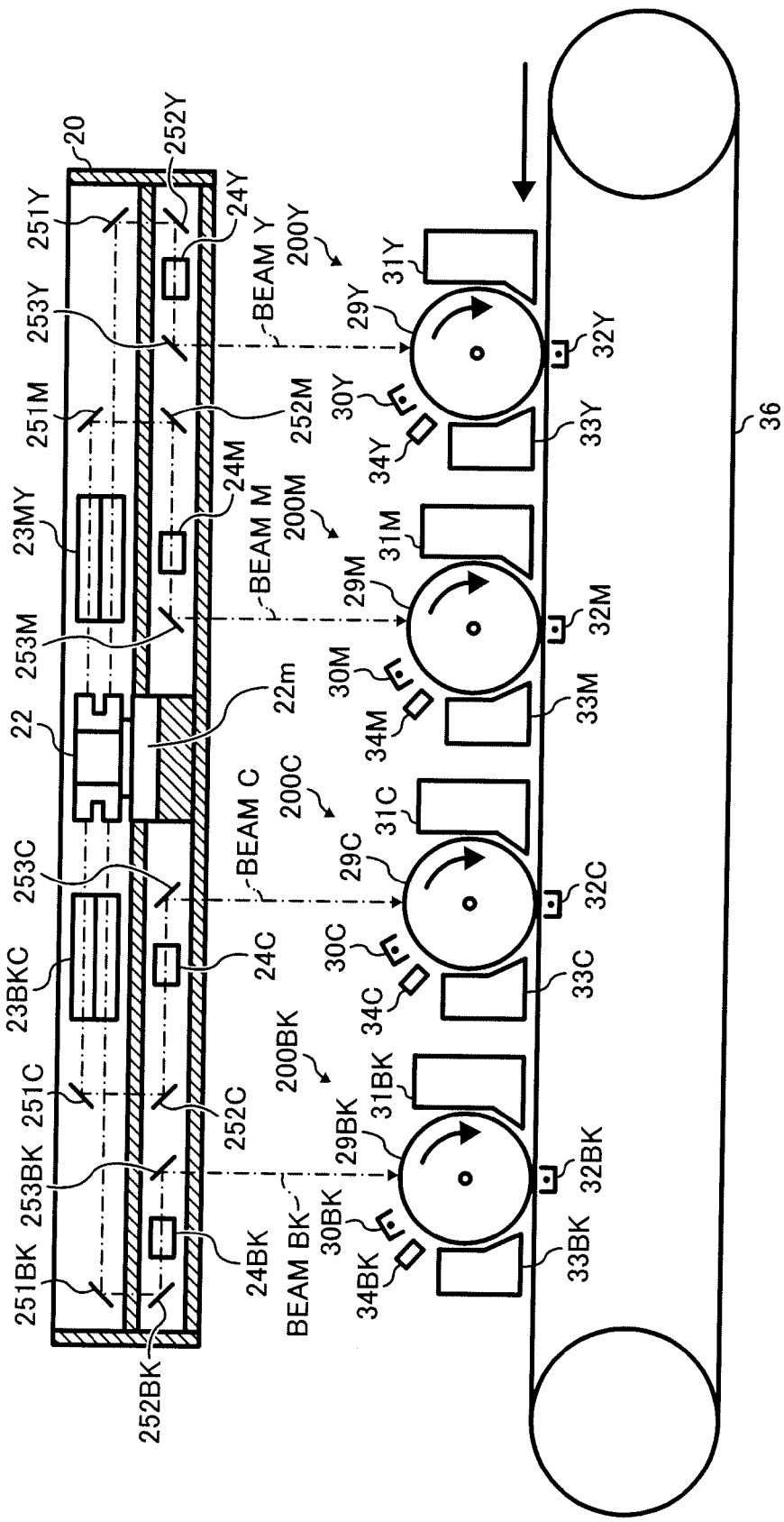
FIG. 1 is a schematic diagram illustrating a color image forming apparatus according to an exemplary embodiment of the present invention.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, a color image forming apparatus according to an exemplary embodiment of the present invention is described.

Referring to FIG. 1, the color image forming apparatus includes an optical beam scanning device 20, image forming units 200BK, 200C, 200M, and 200Y, and a transfer belt 36. The optical beam scanning device 20 includes a plurality of optical elements such as a polygon mirror 22, a polygon motor 22m, fθ lenses 23BKC and 23MY, first mirrors 251BK, 251C, 251M, and 251Y, second mirrors 252BK, 252C, 252M, and 252Y, barrel toroidal lenses (BTL) 24BK, 24C, 24M, and 24Y, laser diodes 10BK, 10C, 10M, and 10Y (shown in FIG. 4), a synchronous detection sensor 7 (shown in FIG. 3) and third mirrors 253BK, 253C, 253M, and 253Y. The image forming units 200BK, 200C, 200M, and 200Y respectively includes photoconductors 29BK, 29C, 29M, and 29Y, charging devices 30BK, 30C, 30M, and 30Y, discharge devices 34BK, 34C, 34M, and 34Y, cleaning units 33BK, 33C, 33M, and 33Y, transfer devices 32BK, 32C, 32M, and 321Y, and development units 31BK, 31C, 31M, and 31Y as image forming elements. This color image forming apparatus of the exemplary embodiment employs a tandem system having the four image forming units 200BK, 200C, 200M, and 200Y for respective four color components, black, cyan, magenta, and yellow which are respectively abbreviated as BK, C, M, and Y. These abbreviations may be omitted as necessary.

The optical beam scanning device 20 emits optical beams of the four color components BK, C, M, and Y to irradiate respective photoconductors 29BK, 29C, 29M, and 29Y. The image forming unit 200BK, 200C, 200M, and 200Y form and develop electrostatic latent images to form the toner images so as to transfer the toner images onto a transfer sheet. The transfer belt 36 conveys the transfer sheet (not shown).

As stated above, the optical beam scanning device 20 includes the plurality of optical elements as follows. The polygon mirror 22 deflects the optical beams of four color components. The polygon motor 22m drives the polygon mirror 22. The fθ lenses 23BKC and 23MY correct scanning speeds of the optical beams. The first mirrors 251BK, 251C, 251M, and 251Y, the second mirrors 252BK, 252C, 252M, and 252Y, and the third mirrors 253BK, 253C, 253M, and 253Y reflect the optical beams. The laser diodes 10BK, 10C, 10M, and 10Y are light emission sources. The synchronous detection sensor 7 detects the optical beams and generates synchronous detection signals. The barrel toroidal lenses (BTL) 24BK, 24C, 24M, and 24Y correct, for example, a focusing function and an optical face tangle error in a sub-scanning direction.

Like the optical beam scanning device 20 including the plurality of optical elements, the image forming image forming units 200BK, 200C, 200M, and 200Y include the plurality of image forming elements as follows. The photoconductors 29BK, 29C, 29M, and 29Y form electrostatic latent images thereon by the optical beams emitted from the optical device 20. The charging devices 30BK, 30C, 30M, and 30Y uniformly charge surfaces of the photoconductor 29BK, 29C, 29M, and 29Y. The discharge devices 34BK, 34C, 34M, and 34Y discharge residual charges of the photoconductors. The cleaning units 33BK, 33C, 33M, and 33Y remove remaining toners from the surfaces of the photoconductors. The transfer devices 32BK, 32C, 32M, and 32Y transfer the toner images onto the transfer sheet. The development units 31BK, 31C, 31M, and 31Y develop the electrostatic latent images on the photoconductors to form the toner images.

This color image forming apparatus employs an electrophotographic method with the tandem system to form the full color image. The color image forming apparatus controls a lighting of each laser diode 10 by image data of respective color component, writes images on photoconductors 29BK, 29C, 29M, and 29Y by a plurality of optical beams emitted from the optical beam scanning device 20, develops the images on the photoconductors with toners by development units 31BK, 31C, 31M, and 31Y, and superimposes the toner images of four colors so as to form the full color image on the transfer sheet.

Since this color image forming apparatus with the tandem system superimposes the toner images of four color components to form the full color image, the four image forming units 200BK, 200C, 200M, and 200Y for respective four color components are disposed therein. As stated above, the photoconductors 29BK, 29C, 29M, and 29Y form the electrostatic latent images thereon by irradiation of the optical beams. The irradiation of the optical beams is provided by one polygon mirror 22 instead of four polygon mirrors as deflecting devices for the four color components. Thereby, a configuration of the color image forming apparatus may be simplified, and a cost thereof may be reduced.

As shown in FIG. 1, the optical beam scanning device 20 deflects the optical beams of different colors by using the polygon mirror 22 that is driven by the polygon motor 22*m*. The polygon mirror 22 has a plurality of mirror faces. One of the plurality of mirror faces deflects the optical beams of two colors at upper and lower portions thereof. In other words, each one of the optical beams of two colors is deflected by either upper portion or lower portion of the mirror face. Another mirror face deflects the optical beams of other two colors at upper and lower portions thereof. These two mirror faces are opposed each other. Thereby, the optical beams deflected by the polygon mirror 22 are spread and centered opposite to each other around the polygon mirror 22. Consequently, each color of the optical beams is deflected by the polygon mirror 22, passes through the fθ lens 23, is reflected off the first mirrors 251 and second mirror 252, passes through the BTL 24, is reflected off the third mirror 253, and scans the photoconductor 29. Thereby, the optical beams of four color components scan respective photoconductors 29BK, 29C, 29M, and 29Y.

When the electrostatic latent images on the photoconductors 29 are developed and transferred onto the transfer sheet by respective image forming units 200, the transfer belt 36 conveys the transfer sheet in a direction shown with an arrow in FIG. 1 so that a first color image is transferred onto the transfer sheet. As the transfer sheet is further conveyed in the arrow direction, second, third, and fourth color images are sequentially transferred onto the transfer sheet. Thereby, the full color image is formed on the transfer sheet by superimposing one image on another. The full color image on the transfer sheet is fixed by a fixing device (not shown).

In the exemplary embodiment shown in FIG. 1, the images are directly transferred from the photoconductors 29 to the transfer sheet to form the full color image. However, an image forming apparatus having an intermediate transfer member can be applied to this exemplary embodiment. When the intermediate transfer member is used, the images are transferred from the photoconductors to the intermediate transfer member, and the images transferred on the intermediate transfer member are secondarily transferred onto the transfer sheet.

Figure 2:
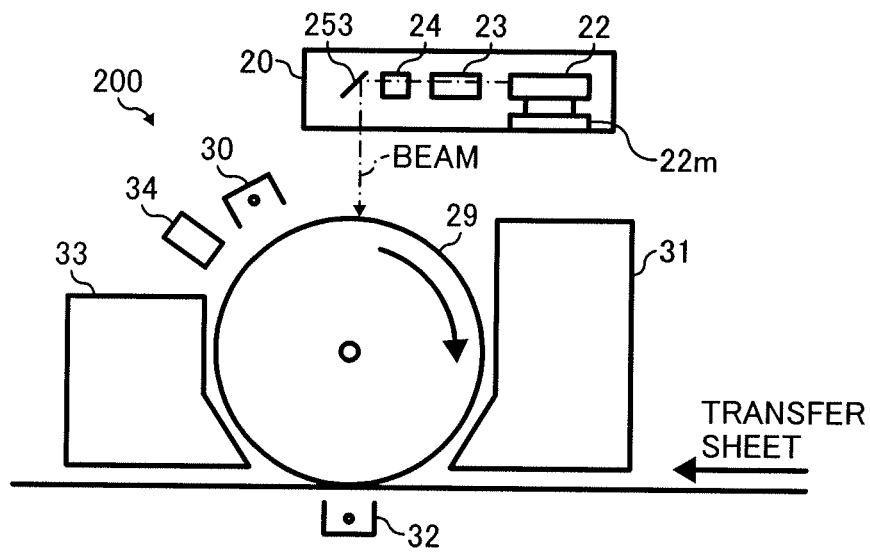
FIG. 2 is a schematic diagram illustrating an optical beam scanning device and an image forming unit included in the image forming apparatus of FIG. 1.

Referring to FIG. 2, the optical beam scanning device 20 and one of the four image forming units 200BK, 200C, 200M, and 200Y included in FIG. 1 are explained in detail. Since each of the four image forming units 200BK, 200C, 200M, and 200Y is similar to other, except for the color components, one of the image forming units is shown as an example without the color abbreviation.

In the optical beam scanning device 20, the laser diode 10 (shown in FIG. 3), the lighting of which is controlled by the image data, outputs the optical beams, and a collimate lens (not shown) collimates the optical beams output from the laser diode 10. As shown in FIG. 2, after the optical beams pass through a cylinder lens (not shown), the optical beams enter into the mirror faces of the polygon mirror 22. The optical beams are deflected by the polygon mirror 22, pass through the fθ lens 23 and the barrel toroidal lens 24, are reflected off the third mirror 253, and irradiate the photoconductor 29.

As also shown in FIG. 2, the image forming unit 200 includes the image forming elements such as the photoconductor 29, the charging device 30, the development unit 31, the transfer device 32, the cleaning unit 33, and the discharge device 34. The photoconductor 29 includes other image forming elements in a vicinity thereof.

The image forming unit 200 using the electrophotographic method forms the full color image on the transfer sheet by carrying out an image forming process such as charging the photoconductor 29 by the charging device 30, irradiating on the photoconductor 29 by the optical beam scanning device 20 so as to form the electrostatic latent image, developing the electrostatic latent image on the photoconductor 29 with toner by the development unit 31, transferring the toner image onto the transfer sheet by the transfer device 32, fixing the toner image on the transfer sheet by the fixing device (not shown), removing a residual toner from the photoconductor 29 by the cleaning unit 33, and discharging the photoconductor 29 by the discharge device 34 to prepare for a next image forming.

The optical beams output from the laser diode 10, which are deflected by the polygon mirror 22, periodically scan a surface of the photoconductor 29 in a main scanning direction by a line scanning, and irradiate a receiving surface of the photoconductor 29 moving in a sub-scanning direction by each line so as to write a two-dimensional image on the receiving surface.

When the photoconductor 29 is irradiated, the image writing position on the photoconductor 29 needs to be constant (the same) for each scanning line so that an occurrence of an image misregistration may be reduced. The synchronous detection sensor 7 (shown in FIG. 3) is disposed to detect the optical beams at a certain position on the scanning line of an image writing start side and generate a synchronous detection signal.

Figure 3:
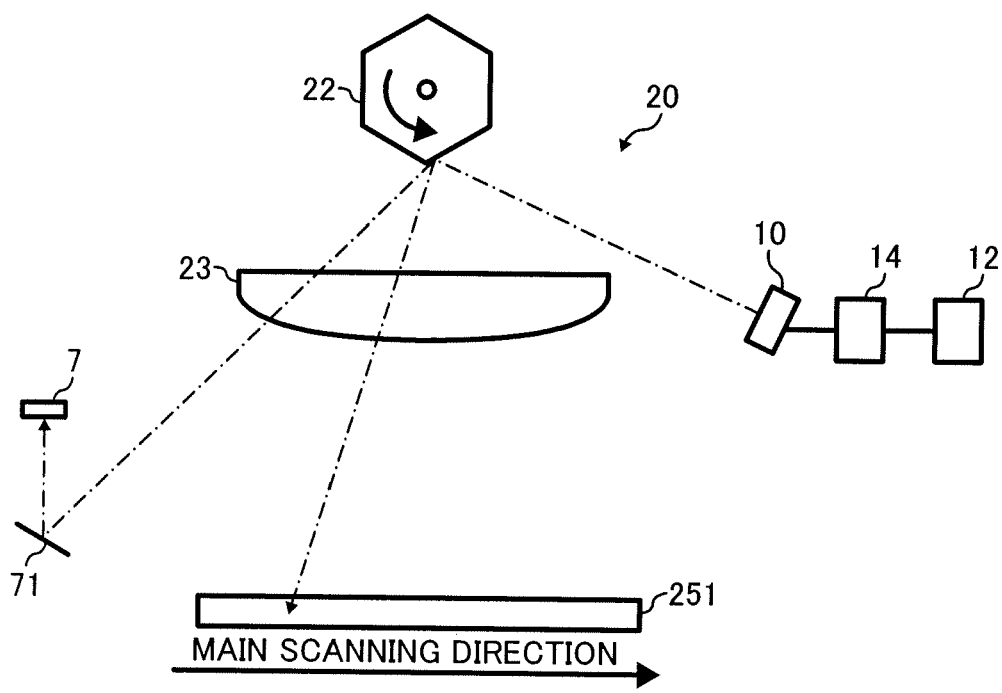
FIG. 3 is a schematic diagram illustrating a synchronous detection of an optical beam.

Referring to FIG. 3, the synchronous detection sensor 7 detects the optical beams. The color abbreviations BK, C, M, and Y for the optical elements may be omitted as necessary.

As shown in FIG. 3, the plurality of optical beams emitted from the laser diode 10 in the optical beam scanning device 20 are deflected by the polygon mirror 22, pass through the fθ lens 23, are reflected off the first mirror 251 so as to scan the photoconductor 29 of FIGS. 1 and 2 in the main scanning direction. One of the optical beams, for example, is directed towards the synchronous detection sensor 7 by reflecting off a mirror 71 which is disposed at a location before the optical beams enter into the first mirror 251. In other words, the mirror 71 is disposed outside the photoconductor 29 in the image writing start side. The synchronous detection sensor 7 detects the optical beam entering at the certain position on the scanning line, and generates the synchronous detection signal.

The synchronous detection sensor 7 detects the optical beams, and instructs a lighting timing of the laser diode 10 for each main scanning line with the synchronous detection signal as a reference in such a manner that the image writing is controlled to begin at the certain position. The lighting timing of the laser diode 10 is based on the image data written in an effective image area. The control of the image writing, for example, may be provided with using the synchronous detection signal as a trigger to begin the image writing after a given time. The given time may be determined by a predetermined clock period.

When the image forming apparatus with the tandem system forms the full color image, a number of the photoconductors to be used is equal to a number of color components. Consequently, a synchronous detection signal may be needed for each color component.

When the images are written on the photoconductors 29BK, 29C, 29M, and 29Y by the optical beams, the synchronous detection sensor 7 detects the optical beams and controls writing timings based on synchronous detection signals for respective color components so that image writing positions on the photoconductors 29BK, 29C, 29M, and 29Y may be constant for respective scanning lines.

According to this exemplary embodiment, a single synchronous detection sensor 7 is disposed to detect all the optical beams and generate all the synchronous detection signals for all the colors. Thereby, the configuration of the color image forming apparatus may be simplified, and the cost thereof may be reduced.

Figure 4:
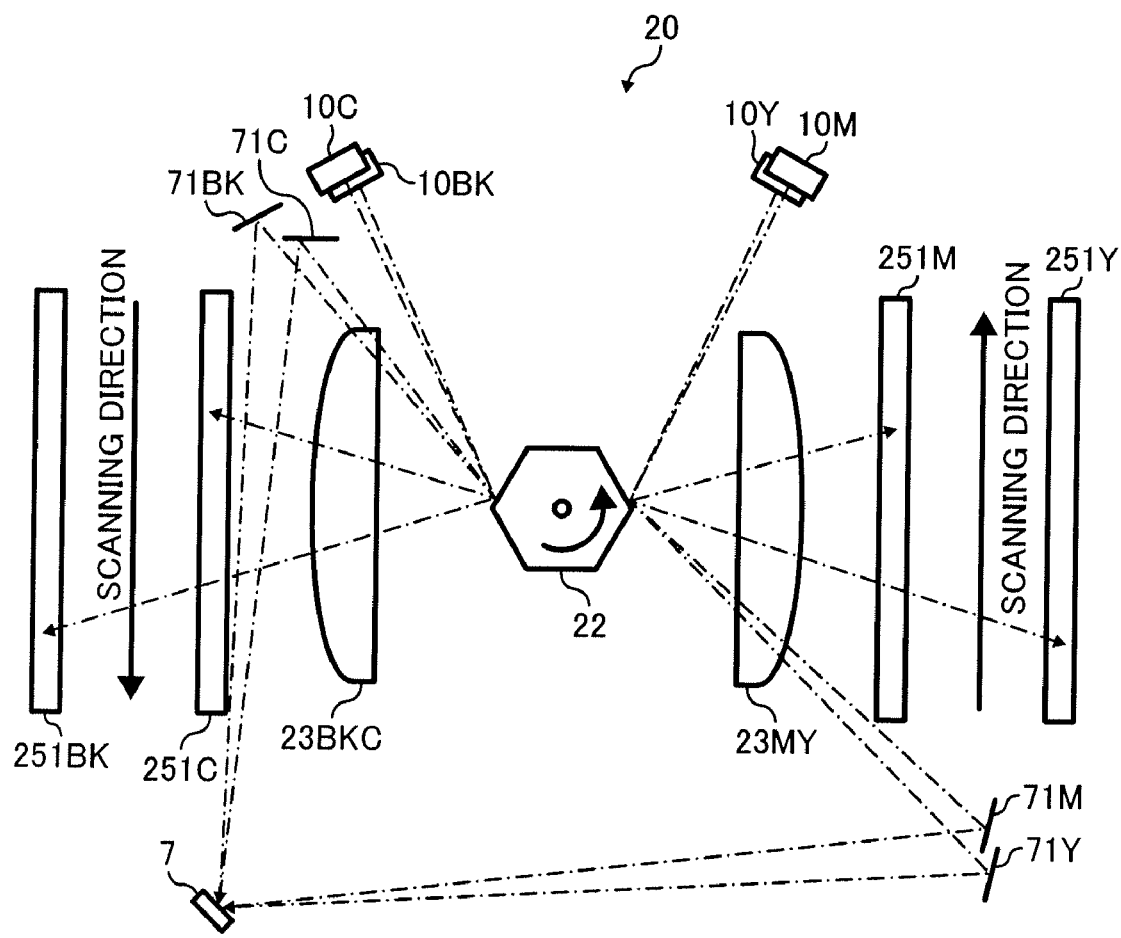
FIG. 4 is a schematic diagram illustrating an example of synchronous detection signals generated by a synchronous detection sensor in the image forming apparatus of FIG. 1.

Referring to FIG. 4, the color image forming apparatus shown in FIG. 1 of the exemplary embodiment of the present invention is provided with synchronous detection signals generated by the synchronous detection sensor 7 for respective color components. As stated above in FIG. 1, the optical beam scanning device 20 uses the opposite mirror faces of the polygon mirror 22 to scan and spread the deflected optical beams in opposite directions. Each mirror face deflects the optical beams of two different color components at the upper and lower portions thereof. This exemplary embodiment, for example, the optical beams of cyan and black are respectively entered into the upper and lower portions of the same mirror face while the optical beams of magenta and yellow are respectively entered into the upper and lower portions of another mirror face. The another mirror face may be directly opposite to the same mirror face.

As shown in FIG. 4, the optical beams of cyan, black, magenta and yellow are respectively output from the laser diodes 10C, 10BK, 10M, and 10Y. The laser diode 10C is disposed above the laser diode 10BK while the laser diode 10M is disposed above the laser diode 10Y so that the optical beams are deflected by respective portions of the opposite mirror faces. The deflected optical beams pass the fθ lenses 23BKC and 23 MY and are reflected off by the first mirrors 251BK, 251C, 251M, and 251Y towards respective photoconductors 29BK, 29C, 29M and 29Y. Here, a pair of deflected optical beams of cyan and black and another pair of deflected optical beams of magenta and yellow are spread symmetrically around the polygon mirror 22, in opposite directions, so that the optical beams scan respective photoconductors 29BK, 29C, 29M and 29Y.

The optical beams of the four color components to scan periodically are deflected by the polygon mirror 22, and are directed towards the synchronous detection sensor 7 by the mirrors 71BK, 71C, 71M, and 71Y. As stated above, the mirrors 71 are disposed at locations before the optical beams are entered into the first mirrors 251. In other words, the mirrors 71 are disposed outside the photoconductors 29 in the image writing start sides. The synchronous detection sensor 7 detects the optical beams of the four color components entering at the certain positions on the scanning lines, and generates the synchronous detection signals for respective color components.

Since the synchronous detection sensor 7 generates the synchronous detection signals, the optical beams may need to be entered into the synchronous detection sensor 7 at different timings in such a manner that the optical beams of four color components are separated by the time base.

Figure 5:
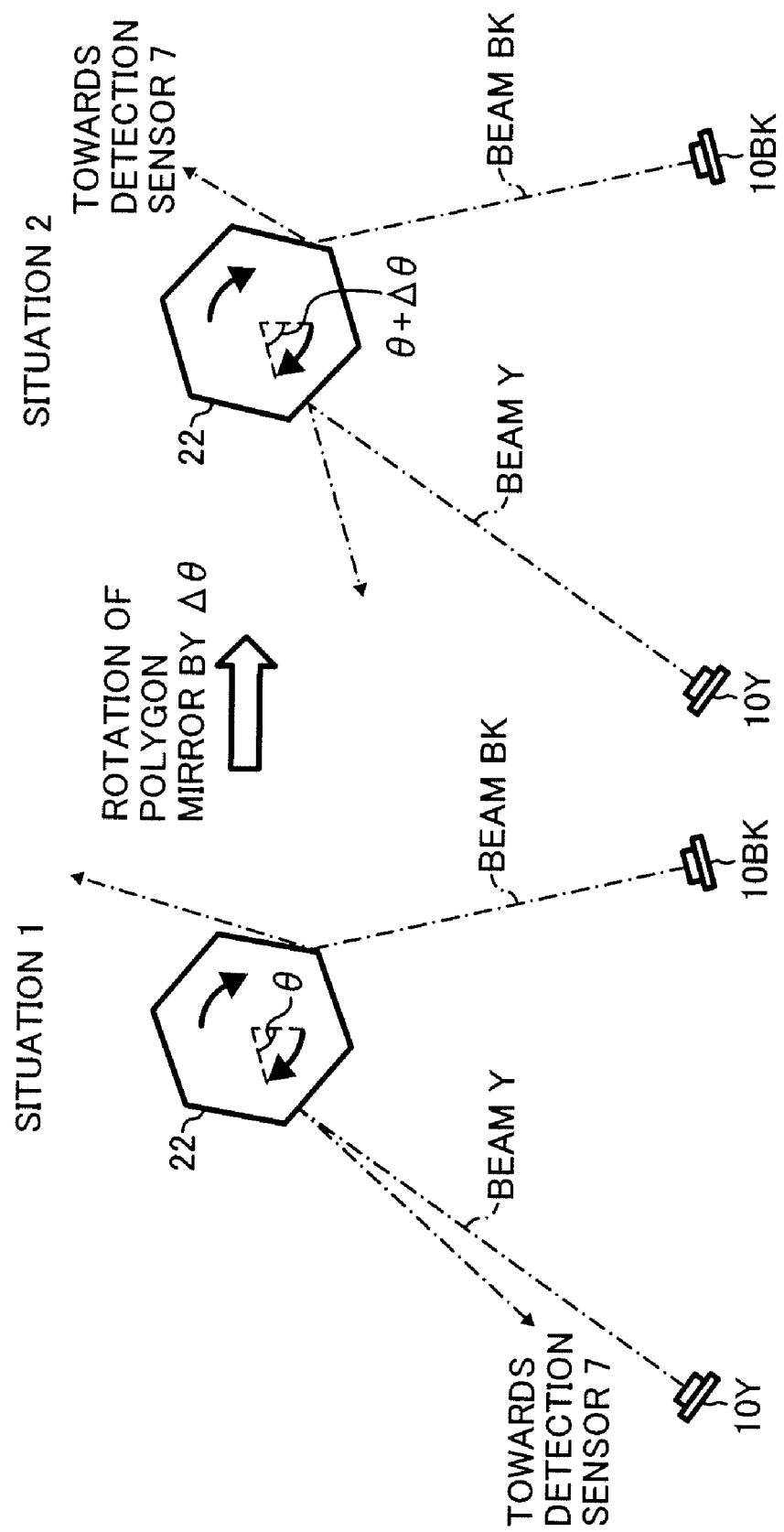
FIG. 5 is a schematic diagram illustrating a separation of the synchronous detection signals by a time base.

Referring to FIG. 5, the synchronous detection signals generated by the synchronous detection sensor 7 from the respective optical beams are separated by the time base. The optical elements including mirrors to reflect the optical beams may be omitted as necessary in FIG. 5.

The optical beams of yellow and black, for example, are reflected off the opposite mirror faces of the polygon mirror 22, and incident beams to the synchronous detection sensor 7 are fluctuated as shown in situations 1 and 2 of FIG. 5.

The situation 1 of FIG. 5 shows the optical beams at a certain timing at which, for example, the polygon mirror 22 is in a position rotated by θ from a reference position. The optical beam emitted from the laser diode 10Y is deflected by the polygon mirror 22 and is entered into the synchronous detection sensor 7 at the timing at which the polygon mirror 22 is in the position of the θ rotation. At the same time, the optical beam BK emitted by the laser diode 10BK is not deflected towards the synchronous detection sensor 7.

The situation 2 of FIG. 5 shows the optical beams at another timing at which the polygon mirror 22 is in a position rotated by θ+Δθ from the reference position. The optical beam emitted from the laser diode 11BK is deflected by the polygon mirror 22 and is entered to the synchronous detection sensor 7 at this timing and the optical beam Y is not deflected towards the synchronous detection sensor 7. The optical beams emitted from the laser diodes 10Y and 10BK are stated as examples. However, the optical beams of cyan and magenta are similar to those of black and yellow. For example, the optical beams emitted from the laser diodes 10C and 10M are entered to the synchronous detection sensor 7 at timings at which the polygon mirror 22 is in a position rotated by θ+2Δθ and θ+3Δθ respectively from the reference position.

As the polygon mirror 22 is rotated in different positions by different angles, the optical beams of the four color components are detected at different timings. Thereby, the synchronous detection signals are separated one from another by the time base.

The synchronous detection signals separated by the time base are used as reference signals for respective color components so as to instruct lighting timings of laser diodes 10Y, 10M, 10C, and 10BK and control the beginning of image writing at the certain positions. The lighting timings of laser diodes 10Y, 10M, 10C, and 10BK are based on the image data written in the effective image areas for respective main scanning lines.

A related art image forming apparatus applies a synchronous detection signal of only a single color to commonly use for all four color components so that optical beams are spread and opposed. In other words, only the optical beams of the single color are deflected by one mirror face of a polygon mirror, and are detected by a detection sensor so as to be commonly used for all the four color components. However, the related art image forming apparatus has generated a jitter that disturbs the image.

The image forming apparatus of this exemplary embodiment shown in FIG. 1 though FIG. 5, on the other hand, employs the polygon mirror 22 that generates the synchronous detection signals of each of the four color components from the optical beams of respective color components. Therefore, an occurrence of the jitter may be reduced and a quality of the writing image may remain high.

This exemplary embodiment of the present invention stated above uses the polygon mirror 22 to deflect the optical beams. The deflected optical beams are spread and (symmetrically) centered opposite to each other around the polygon mirror 22. For example, when the images are written on the four photoconductors, the sensor outputs of the optical beams of the four colors are used as the synchronous detection signals of respective colors. As shown in FIG. 1 and FIG. 5, the optical beams of the four color components are spread and opposed to scan, and each of the optical beams of two color components are entered into one of the mirror faces of the polygon mirror 22. Each mirror face has upper and lower portions to deflect the optical beams of the two colors. When one mirror face deflects a plurality of optical beams in this exemplary embodiment shown FIG. 1 through FIG. 5, a likelihood of an error occurrence between the plurality of optical beams may be significantly small. Therefore, the color image forming apparatus of this embodiment may be simplified so as to, for example, reduce costs thereof by another exemplary embodiment shown in FIG. 6.

Figure 6:
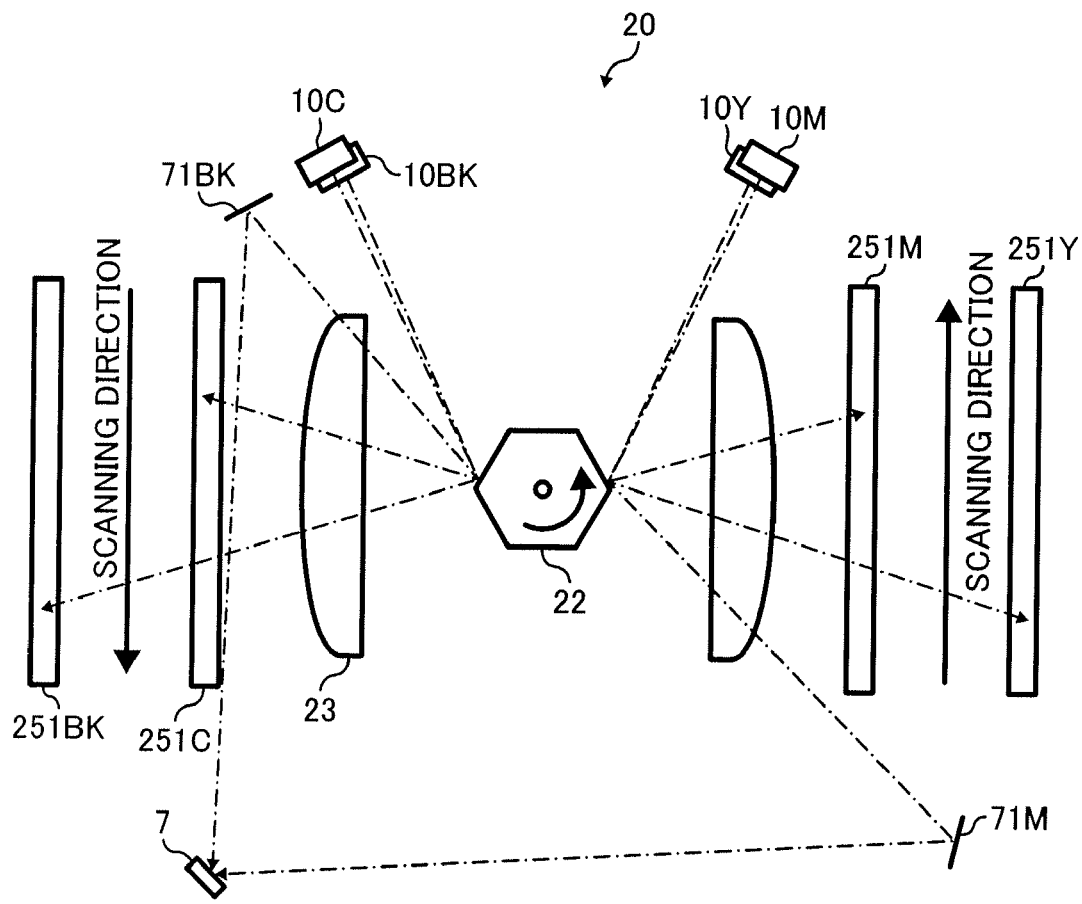
FIG. 6 is a schematic diagram illustrating another example of the synchronous detection signals generated by the single synchronous detection sensor according to another exemplary embodiment of the present invention.

In the exemplary embodiment shown in FIG. 6, the synchronous detection sensor 7, detecting the optical beam of one color component deflected by one mirror face of the polygon mirror 22, generates the synchronous detection sensor that may be commonly used for the optical beam of another color component deflected by the same mirror face. Thereby, a number of the optical beams to be detected may be reduced, and the color image forming apparatus may be configured to be simplified, for example, without having the mirrors 71C and 71Y. In other words, only one control signal is generated for those optical beams reflected on faces provided on a same side of the polygon mirror 22.

Referring to FIG. 6, another exemplary embodiment of the present invention employing another method to generate the synchronous detection signal by the synchronous detection sensor 7 in the color image forming apparatus with the tandem system of FIG. 1 is described. As the optical elements of FIG. 6 are similar to those of FIG. 4, except for the mirrors 71C and 71Y, reference numbers used in FIG. 4 and FIG. 6 may be similar.

Similar to FIG. 4, the optical beam scanning device 20 of this exemplary embodiment shown in FIG. 6 uses the polygon mirror 22 having the mirror faces. Thereby, the optical beams of two color components are entered into one of the mirror faces while the optical beams of other two color components are entered into another mirror face so that the optical beams emitted from the laser diodes 10BK, 10C, 10Y, and 10M are spread into two, for example, black and cyan, and magenta and yellow. The optical beams of black and cyan, and magenta and yellow scan respective photoconductors in opposite directions. As these optical elements are similar to those of FIG. 4, a detailed description of each optical element may be omitted.

As shown in FIG. 6, the synchronous detection sensor 7 detects the optical beams of black and magenta. The optical beams of four color components are deflected by the polygon mirror 22. However, the optical beams of black and magenta out of the four colors are respectively reflected off the mirrors 71BK and 71M so as to be directed towards the synchronous detection sensor 7. The mirrors 71BK and 71K are disposed at the locations before the optical beams are entered into the first mirrors 251BK and 251M. In other words, the mirrors 71BK and 71M are disposed outside the photoconductors 29 in the image writing start sides. The synchronous detection sensor 7 detects the optical beams of black and magenta entering at the certain positions on the scanning lines, and generates the synchronous detection signals for respective color components.

Since one piece of the synchronous detection sensor 7 generates the synchronous detection signals of different color components, the optical beams may need to be entered into the synchronous detection sensor 7 at different timings in such a manner that the optical beams of different color components are separated by the time base. That is similar to the exemplary embodiment previously stated in FIG. 5.

The synchronous detection signals of the optical beams of black and magenta detected by the synchronous detection sensor 7 are separated by the time base and are used as the reference signals for respective color components so as to instruct the lighting timings of the laser diodes 10BK and 10M and control the beginning of the image writing at the certain positions. The lighting timings of laser diodes 10BK and 10M are based on the image data written in the effective image areas for respective main scanning lines.

The optical beams of other color components such as cyan and yellow are described as follows. The optical beam of cyan is deflected by the mirror face of the polygon mirror 22 by which the optical beam of black is deflected. The optical beams of cyan and black use the same mirror face so as to be deflected. Similarly, the optical beams of yellow and magenta are deflected by another mirror face of the polygon mirror 22. The optical beams of cyan and yellow respectively use the synchronous detection signals of the optical beams of black and magenta.

In other words, the synchronous detection signal of black is commonly used for the optical beams of cyan and black while the synchronous detection signal of magenta is commonly used for the optical beams of yellow and magenta. Thereby, the optical beams of cyan and yellow respectively use the synchronous detection signals of black and magenta to instruct the lighting timings of the laser diodes 10C and 10Y, and control the beginning of the image writing at the certain positions.

According to this exemplary embodiment, the synchronous detection sensor 7 detecting the optical beam of one color component deflected by one mirror face of the polygon mirror 22 generates the synchronous detection signal that may be commonly used for the optical beam of another color component deflected by the same mirror face. Therefore, an occurrence of the jitter stated above in the related art image forming apparatus may be reduced, and the quality of the writing image may remain high.

Still another exemplary embodiment of the present invention will be described in FIG. 7. This exemplary embodiment of FIG. 7 includes an adjustment process to reduce an error occurrence when the synchronous detection sensor 7 shown in the exemplary embodiments of FIG. 4 and FIG. 6 is used to detect the synchronous detection signals of a plurality of the optical beams.

These exemplary embodiments shown in FIG. 4 and FIG. 6 respectively detect the optical beams of four and two color components by the synchronous detection sensor 7. Regardless of FIG. 4 and FIG. 6, the optical beams entering into the synchronous detection sensor 7 are inclined against a detection face of the synchronous detection sensor 7 because of an arrangement of the optical elements.

Figure 7:
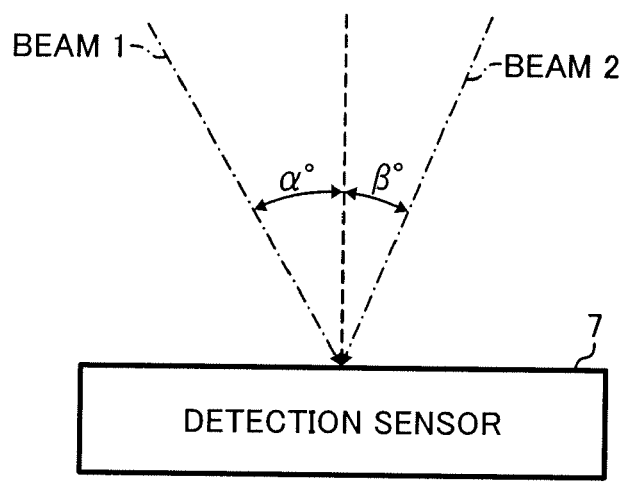
FIG. 7 is a schematic diagram illustrating a state of the optical beam entering into the synchronous detection sensor.

Referring to FIG. 7, the optical beams are entered into the synchronous detection sensor 7 in a state that the optical beams are inclined relative to a normal to the surface of the synchronous detection sensor 7. When the inclined optical beams are entered into the synchronous detection sensor 7, a detection light intensity detected by the synchronous detection sensor 7 may be reduced compared to a largest light intensity which may be detected in a case where the optical beams are vertically entered. Consequently, the synchronous detection signals from the synchronous detection sensor 7 may have an error. When the detection amount fluctuates with a variation in an incident angle that is an angle of the optical beam to enter into the synchronous detection sensor 7, timings of the synchronous detection signals may be slightly fluctuated.

When the inclined optical beams are entered into the synchronous detection sensor 7, the light intensity of the inclined optical beams are adjusted in such a manner that a suitable light intensity is provided. For example, when the optical beams are spread and opposed to scan as shown in FIG. 7, one side of the optical beams is called an optical beam 1, and another side of the optical beams is called an optical beam 2. The optical beams 1 and 2 are assumed to have incident angles $\alpha$ and $\beta$ degrees respectively. When the optical beam 1 is entered at the $\alpha$ degree of incident angle, the light intensity may be reduced by $\alpha$% from a case where the optical beam is vertically entered. When the optical beam 2 is entered at the $\beta$ degree, the light intensity may be reduced by $\beta$% from a case where optical beam is vertically entered. The reduction of the light intensity may be controlled by a lighting control unit 12 of the laser diode as shown in FIG. 3. Therefore, the lighting control unit 12 controlling the lighting of the laser diode 10 transmits an intensity adjustment signal to a driving unit 14 of the laser diode so as to adjust the light intensity of the laser diode and obtain the suitable light intensity. The intensity adjustment signals are transmitted to, for example, increase the optical beams 1 and 2 by $\alpha$% and $\beta$% respectively in this exemplary embodiment. Therefore, an occurrence of shifting the writing timing between the optical beams 1 and 2 may be reduced.

Each exemplary embodiment of the present invention above is illustrated by applying to the color image forming apparatus with the electrophotographic method that the images are written by the optical beams having the image data of the four color components. However, the stated disclosure and description of the exemplary embodiments are illustrative only and are not to be considered limiting. The present invention may be applied to an area employing an optical writing method by using a plurality of optical beams, for example, an area in which data is written and/or recorded to an optical recording medium utilizing a photo-magnetic effect.

Numerous additional modifications and variation are possible in light of the above teachings. It is therefore to be understood that within the scope of the appended claims, the disclosure of this patent specification may be practiced otherwise than as specifically described herein.

What is claimed is:

1. An image forming apparatus, comprising:
   a light emission source configured to output a plurality of optical beams in accordance with image data;
   a rotary polygon mirror configured to receive the plurality of optical beams at different mirror points with different mirror positions and to deflect the beams into a plurality of scanning optical beams in given directions to cyclically scan on a plurality of predetermined scanning lines in a main scanning direction, said plurality of scanning optical beams being all scanning beams used to form an image corresponding to the image data;
   a plurality of image carrying members configured to rotate in a sub-scanning direction line by line and to respectively receive the plurality of scanning optical beams to form a plurality of primary separate color images;
   a single synchronous detection sensor configured to receive the plurality of scanning optical beams reflected from oppositely positioned mirror surfaces of the rotary polygon mirror; and
   an instruction mechanism configured to instruct the light emission source to light on and off at timings determined based on a plurality of detection signals from the single synchronous detection sensor.

2. The image forming apparatus of claim 1, wherein the instruction mechanism instructs the light emission source to light on and off at timings determined based on the plurality of detection signals from the single synchronous detection sensor such that the plurality of primary separate color images formed on the plurality of image carrying members are sequentially transferred onto a recording medium to overlay one on another into a full-color image in accordance with the image data.

3. The image forming apparatus of claim 1, wherein the rotary polygon mirror includes a plurality of connected mirror surfaces, and the plurality of scanning optical beams are separated into a plurality of beam groups,
   wherein another plurality of scanning optical beams in each of the plurality of beam groups impinge on one of the plurality of connected mirror surfaces, and each of the scanning optical beams in a beam group impinge on a same mirror surface,
   wherein the single synchronous detection sensor detects one of the another plurality of scanning optical beams in each of the plurality of beam groups, and
   wherein the instruction mechanism applies a detection signal from the single synchronous detection sensor for each of the plurality of beam groups to remaining optical beams not detected by the single synchronous detection sensor in each of the plurality of beam groups, and instructs the light emission source to light on and off at timings determined based on a plurality of detection signals from the single synchronous detection sensor.

4. The image forming apparatus of claim 1, further comprising:
   an adjustment mechanism configured to adjust a light emission amount of the light emission source in response to an incident angle of the plurality of scanning optical beams to the single synchronous detection sensor such that an amount of light detected by the single synchronous detection sensor is substantially constant through the plurality of scanning optical beams.

5. The image forming apparatus of claim 1, further comprising:
   a plurality of mirrors disposed so that each one receives one of the plurality of scanning optical beams deflected from the rotary polygon mirror and reflects the one of the plurality of scanning optical beams to the single synchronous detection sensor.

6. The image forming apparatus of claim 1, wherein opposite mirror surfaces of the rotary polygon mirror each deflect two optical beams of different color components.

7. An image forming method, comprising:
providing a light emission source to output a plurality of optical beams in accordance with image data;
rotating a rotary polygon mirror to receive the plurality of optical beams at different mirror points with different mirror positions and to deflect the beams into a first plurality of scanning optical beams in given directions to cyclically scan on a plurality of predetermined scanning lines in a main scanning direction, said first plurality of scanning optical beams being all scanning beams used to form an image corresponding to the image data;
driving a plurality of image carrying members to rotate in a sub-scanning direction line by line and to respectively receive the first plurality of scanning optical beams to form a plurality of primary separate color images;
receiving the plurality of scanning optical beams reflected from oppositely positioned mirror surfaces of the rotary polygon mirror at a single synchronous detection sensor; and
instructing the light emission source to light on and off at timings determined based on a plurality of detection signals from the single synchronous detection sensor.

8. The image forming method of claim 7, wherein the instructing step instructs the light emission source to light on and off at timings determined based on the plurality of detection signals from the single synchronous detection sensor such that the plurality of primary separate color images formed on the plurality of image carrying members are sequentially transferred onto a recording medium to overlay one on another into a full-color image in accordance with the image data.

9. The image forming method of claim 7, wherein the rotary polygon mirror includes a plurality of connected mirror surfaces, and the first plurality of scanning optical beams are separated into a plurality of beam groups,
wherein a third plurality of scanning optical beams in each of the plurality of beam groups impinge on one of the plurality of connected mirror surfaces, and each of the scanning optical beams in a beam group impinge on a same mirror surface,
wherein the single synchronous detection sensor detects one of the third plurality of scanning optical beams in each of the plurality of beam groups, and
wherein the instructing step applies a detection signal from the single synchronous detection sensor for each of the plurality of beam groups to remaining optical beams not detected by the single synchronous detection sensor in each of the plurality of beam groups, and instructs the light emission source to light on and off at timings determined based on a plurality of detection signals from the single synchronous detection sensor.

10. The image forming method of claim 7, further comprising:
adjusting a light emission amount of the light emission source in response to an incident angle of each of the second plurality of scanning optical beams to the single synchronous detection sensor such that an amount of light detected by the single synchronous detection sensor is substantially constant through the second plurality of scanning optical beams.

11. An optical writing apparatus, comprising:
a light emission source configured to output a plurality of optical beams in accordance with image data;
a rotary polygon mirror configured to receive the plurality of optical beams at different mirror points with different mirror positions and to deflect the beams into a first plurality of scanning optical beams in given directions to cyclically scan along a plurality of predetermined scanning lines in a main scanning direction on a plurality of image carrying members provided to rotate in a sub-scanning direction line by line and to respectively receive the first plurality of scanning optical beams to form a plurality of primary separate color images, said plurality of scanning optical beams being all scanning beams used to form an image corresponding to the image data;
a single synchronous detection sensor configured to detect a second plurality of scanning optical beams included in the first plurality of scanning optical beams reflected from oppositely positioned mirror surfaces of the rotary polygon mirror; and
an instruction mechanism configured to instruct the light emission source to light on and off at timings determined based on a plurality of detection signals from the single synchronous detection sensor.

12. The optical writing apparatus of claim 11, wherein the instruction mechanism instructs the light emission source to light on and off at timings determined based on the plurality of detection signals from the single synchronous detection sensor such that the plurality of primary separate color images formed on the plurality of image carrying members are sequentially transferred onto a recording medium to overlay one on another into a full-color image in accordance with the image data.

13. The optical writing apparatus of claim 11, wherein the rotary polygon mirror includes a plurality of connected mirror surfaces, and the first plurality of scanning optical beams are separated into a plurality of beam groups,
wherein a third plurality of scanning optical beams included in a beam group impinge on a same mirror surface of the rotary polygon mirror, and each of the scanning optical beams in a beam group impinge on a same mirror surface,
wherein the single synchronous detection sensor detects one of the third plurality of scanning optical beams in each of the plurality of beam groups, and
wherein the instruction mechanism applies a detection signal from the single synchronous detection sensor for each of the plurality of beam groups to remaining optical beams not detected by the single synchronous detection sensor in each of the plurality of beam groups, and instructs the light emission source to light on and off at timings determined based on a plurality of detection signals from the single synchronous detection sensor.

14. The optical writing apparatus of claim 11, further comprising:
an adjustment mechanism configured to adjust a light emission amount of the light emission source in response to an incident angle of each of the second plurality of scanning optical beams to the single synchronous detection sensor such that an amount of light detected by the single synchronous detection sensor is substantially constant through the second plurality of scanning optical beams.

15. An image forming apparatus, comprising:
  plural light emission sources each configured to output an optical beam;
  a light reflecting unit configured to receive the optical beam from each light emission source of the plural light emission sources and to reflect the optical beam;
  plural image carrying members each configured to receive a corresponding optical beam reflected by the light reflecting unit, said corresponding optical beams reflected by the light reflecting unit being all scanning beams used to form an image;
  a single synchronous detection sensor configured to receive each optical beam of at least half of the plural light emission sources prior to arriving at the plural image carrying members, and to generate detection signals, each corresponding to one of the at least half of the plural light emission sources, wherein the optical beams received by the single synchronous detection sensor are reflected from oppositely positioned mirror surfaces of the light reflecting unit; and
  an instruction mechanism configured to instruct each light emission source when to light on and off, at different timings, based on the detection signals corresponding to the at least half of the plural light emission sources.

16. The image forming apparatus of claim 15, wherein the single synchronous detection sensor is configured to receive optical beams from each light emission source prior to arriving at the plural image carrying members, and to generate detection signals corresponding to each light emission source.

17. The image forming apparatus of claim 16, wherein the instruction mechanism is configured to instruct each light emission source when to light on and off, at different timings, based on a corresponding detection signal received from the single synchronous detection sensor for each light emission source.

18. The image forming apparatus of claim 15, further comprising:
  an adjustment mechanism configured to adjust a light emission amount of each light emission source in response to an incident angle of an optical beam incident to the single synchronous detection sensor such that an amount of light detected by the single synchronous detection sensor is substantially constant for each light emission source.

* * * * *